July 22, 1969  C. KARKOSKA  3,457,134
DECORATIVE ORNAMENT AND METHOD OF PRODUCING IT
Filed Oct. 13, 1965  6 Sheets-Sheet 1
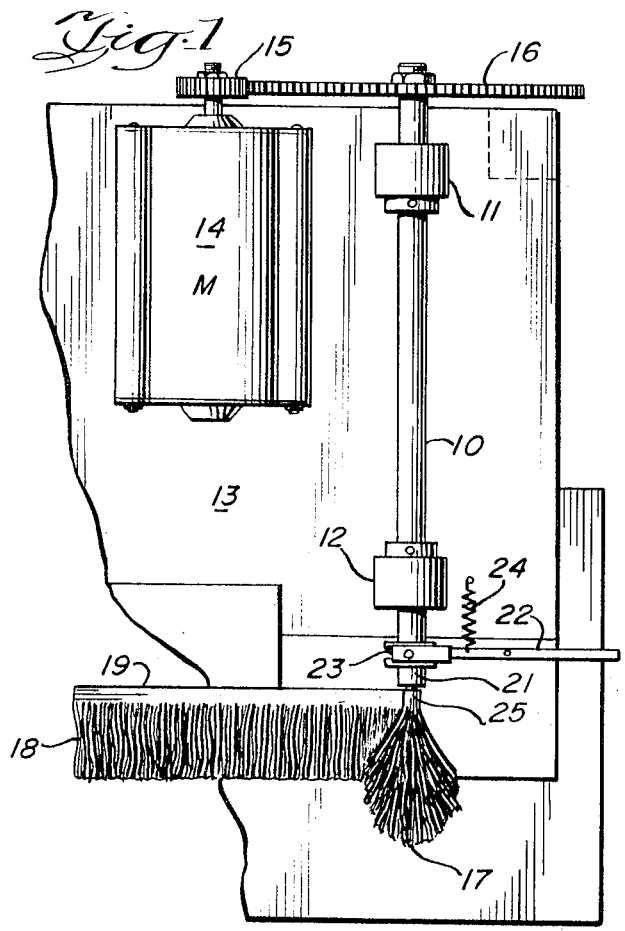
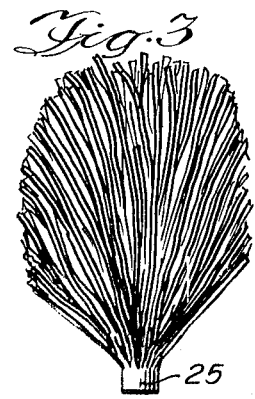
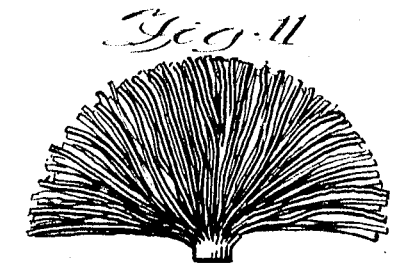
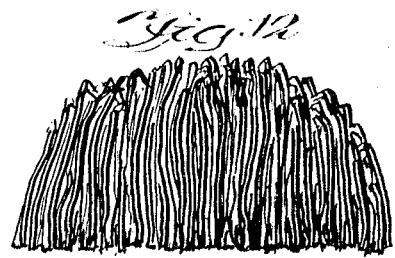
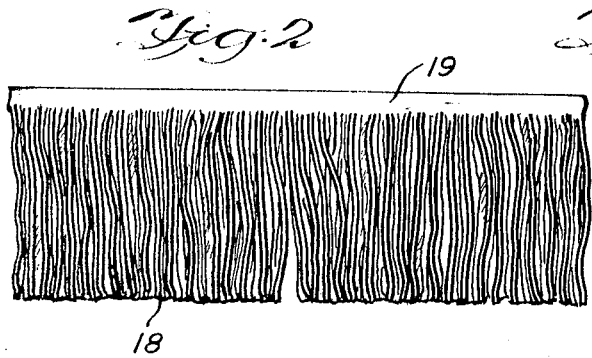
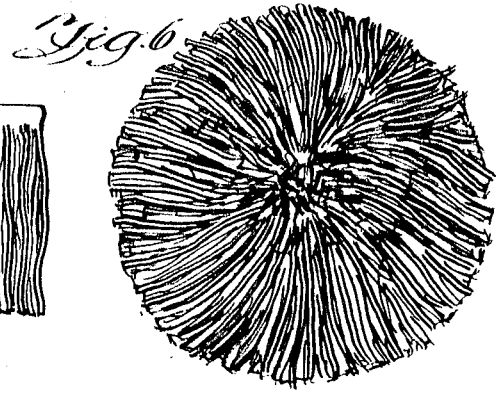
INVENTOR
Charles Karkoska
BY Merriam, Marshall, Shapiro & Klose
ATTORNEYS

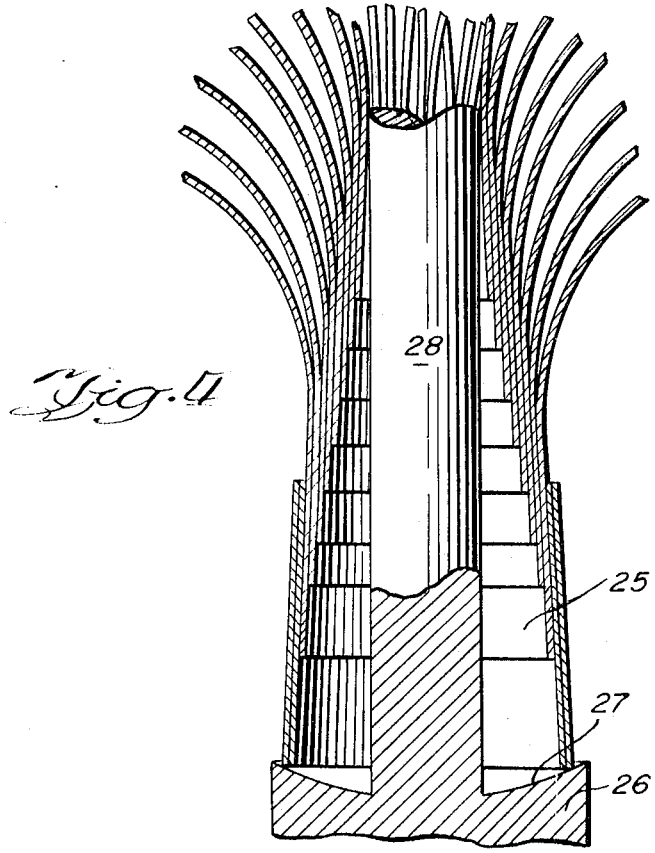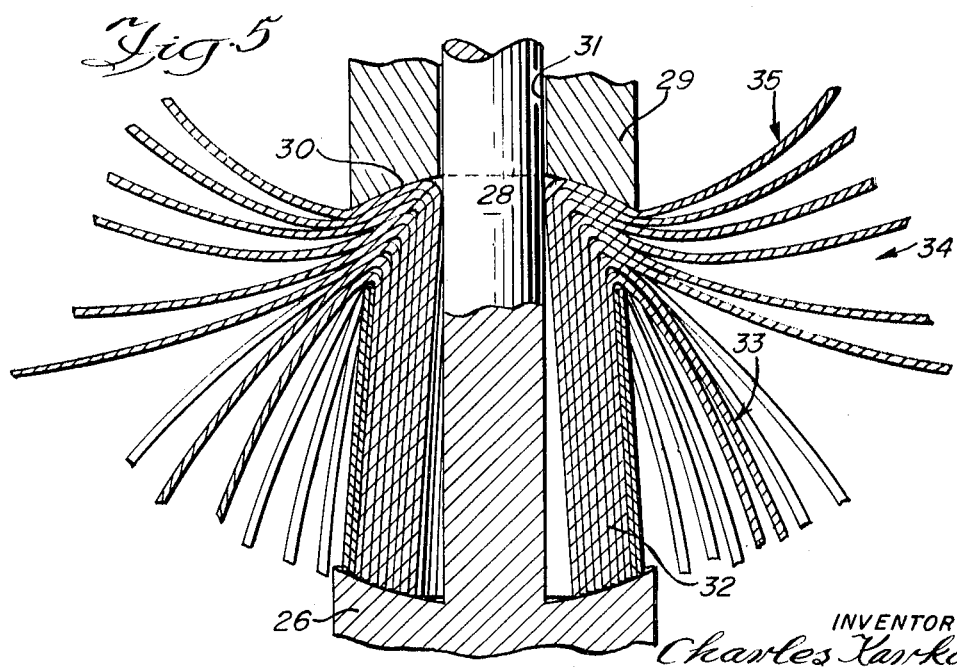

July 22, 1969  C. KARKOSKA  3,457,134
DECORATIVE ORNAMENT AND METHOD OF PRODUCING IT
Filed Oct. 13, 1965  6 Sheets-Sheet 3
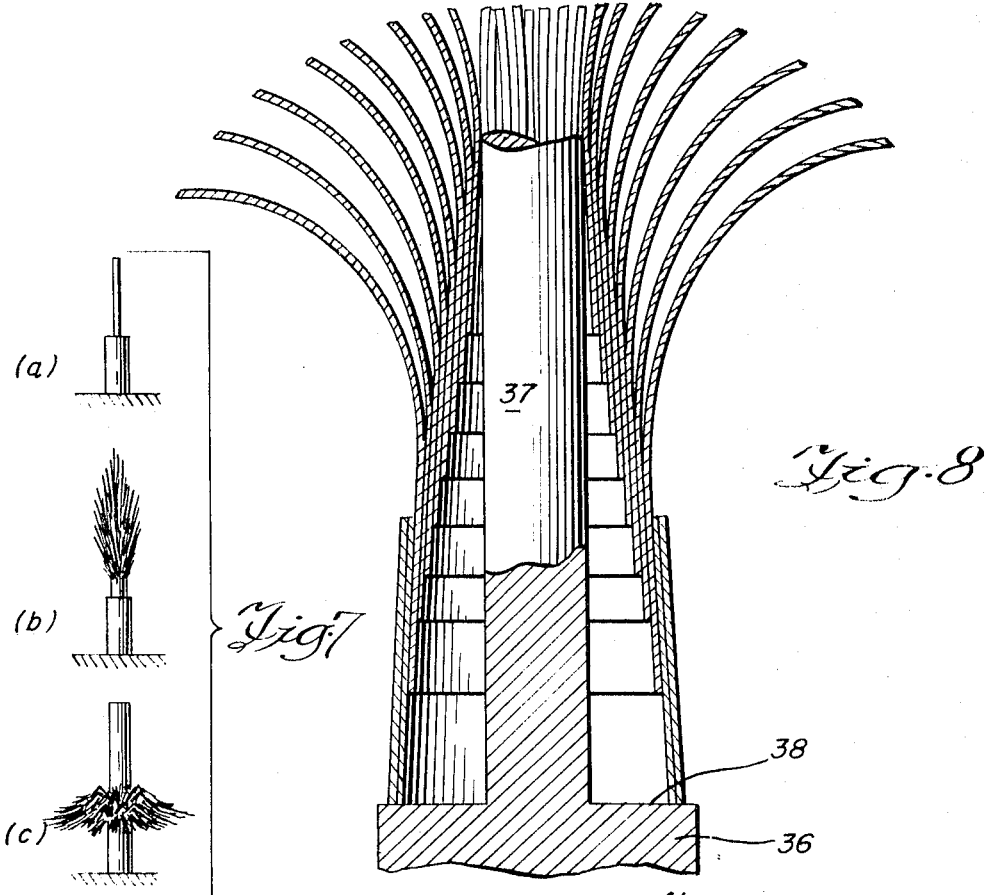
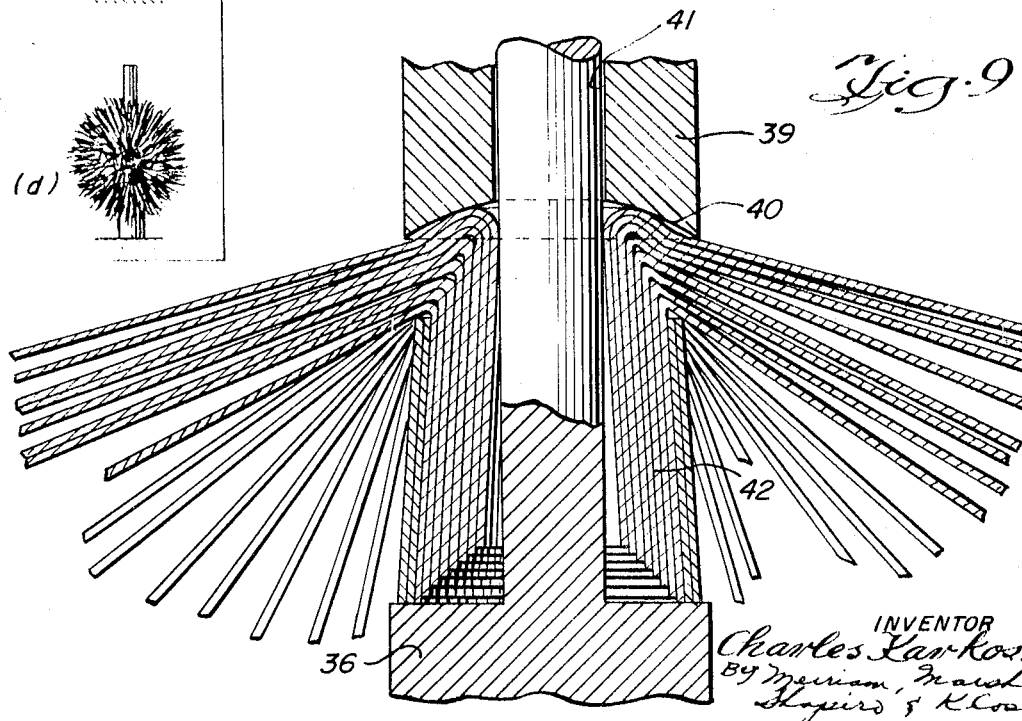
INVENTOR
Charles Karkoska
BY Merriam, Marshall, Shapiro & Klose
ATTORNEYS INVENTOR
Charles Karkoska
BY Merriam, Marshall, Shapiro & Klose
ATTORNEYS July 22, 1969         C. KARKOSKA         3,457,134
DECORATIVE ORNAMENT AND METHOD OF PRODUCING IT
Filed Oct. 13, 1965         6 Sheets-Sheet 5
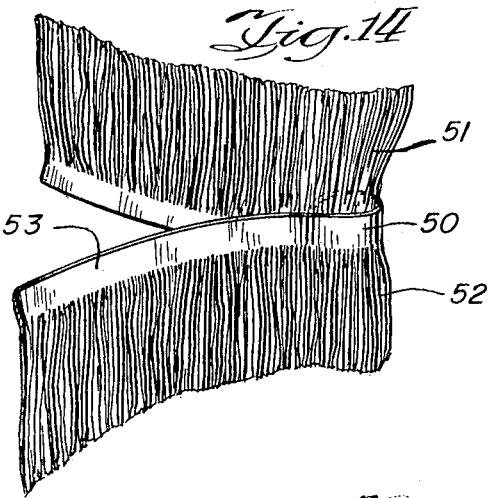
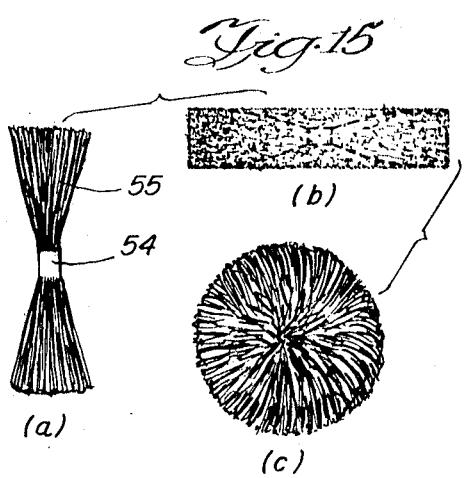
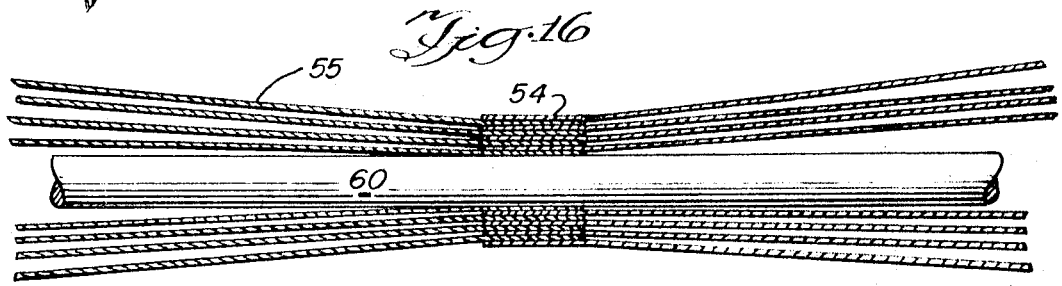
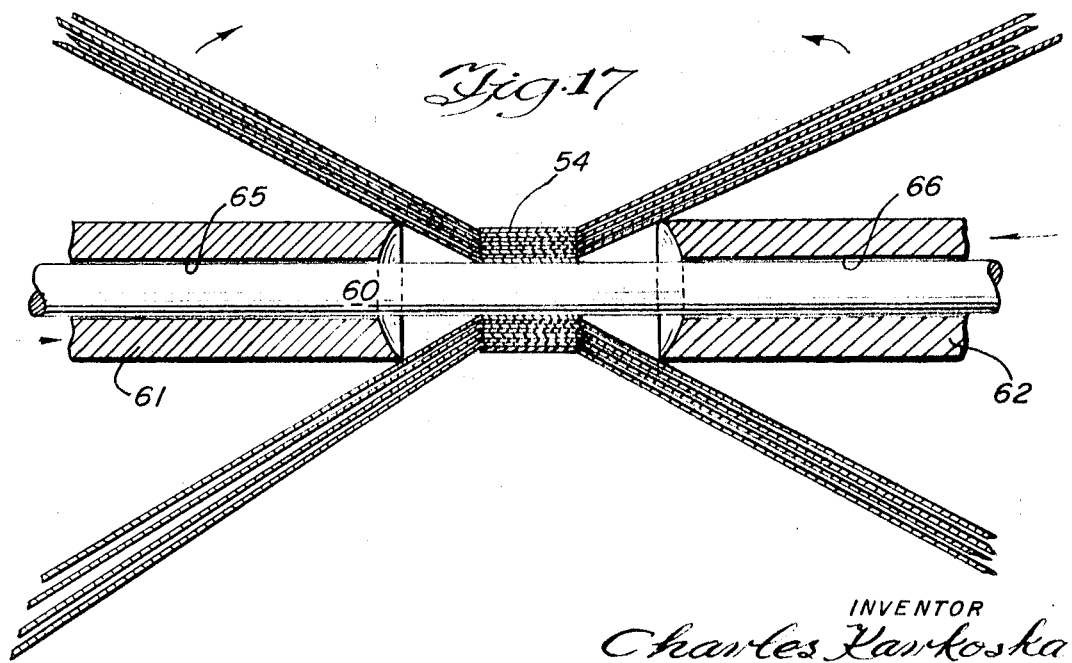
INVENTOR
Charles Karkoska
BY Merriam, Marshall, Shapiro & Klose
ATTORNEYS July 22, 1969        C. KARKOSKA        3,457,134
DECORATIVE ORNAMENT AND METHOD OF PRODUCING IT
Filed Oct. 13, 1965        6 Sheets-Sheet 6
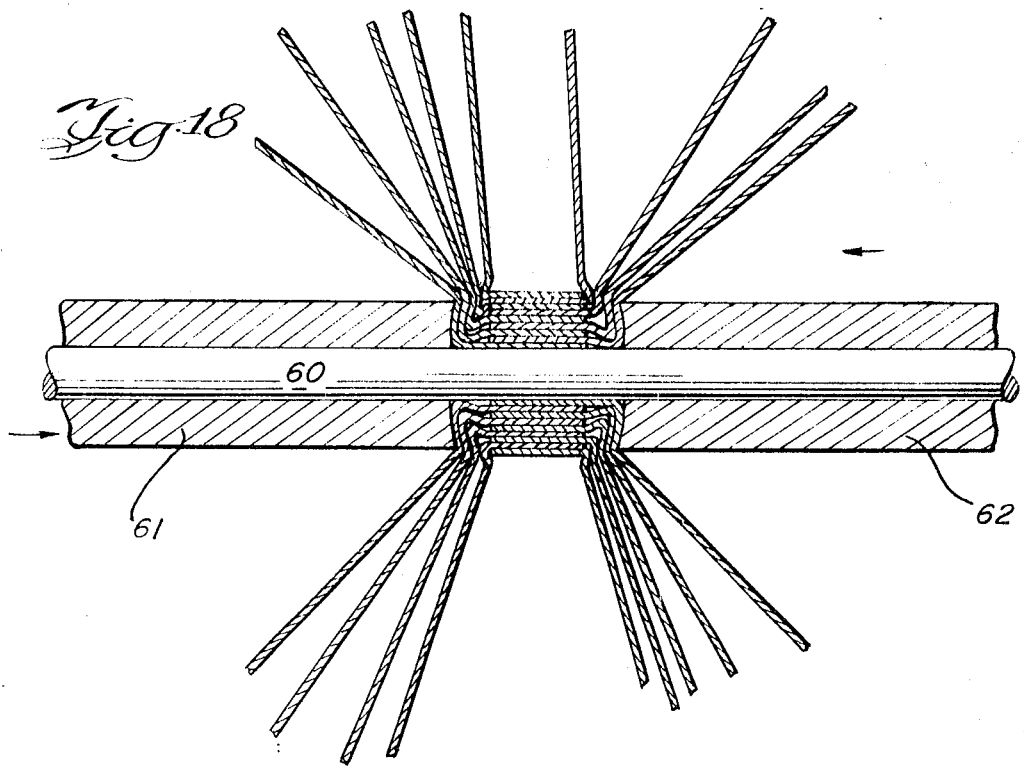
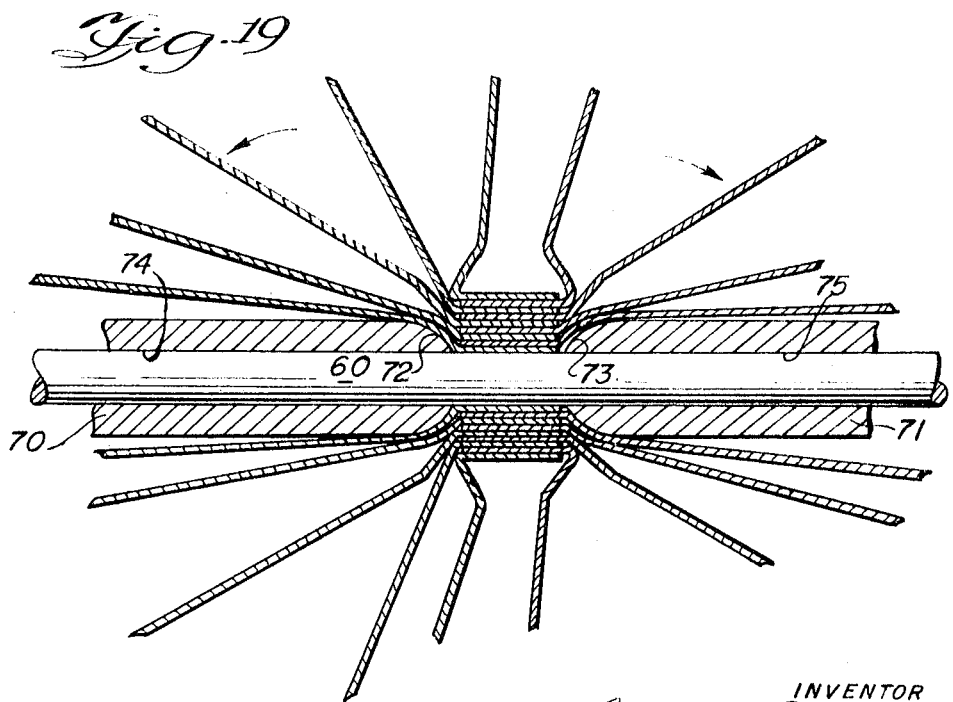
INVENTOR
Charles Karkoska
BY Merriam, Marshall, Shapiro & Klose
ATTORNEYS United States Patent Office 3,457,134
Patented July 22, 1969

3,457,134
DECORATIVE ORNAMENT AND METHOD
OF PRODUCING IT
Charles Karkoska, 1351 W. 47th St.,
Chicago, Ill. 60609
Filed Oct. 13, 1965, Ser. No. 495,623
Int. Cl. A47g 33/06
U.S. Cl. 161—9                12 Claims

ABSTRACT OF THE DISCLOSURE

A spherically shaped ornamental device produced by winding a shredded needle foil to form a wound cluster around a core, bending the needles in the cluster from inside of the cluster to spread the needles outwardly, and deforming a portion of the bent needles to form a spherically shaped cluster with the needles emanating radially in all directions from the core.

---

The continual demands of interior and exterior display designs for novel arrangements require a constant supply of new ornamental devices. The availability of ductile metal foils, such as aluminum foil, has facilitated manufacture of a wide variety of garlands, wreaths, and festoons. One extensive application of metal foil was in the manufacture of artificial Christmas trees such as shown in Hankus U.S. Patent No. 2,889,650. Shredded aluminum was spiral wound onto a metal wire core to provide a simulated tree branch. A plurality of such branches were inserted in an upright standard in assembling the completed tree.

The metal foil used in tree construction could be shredded in a variety of ways which produced flat "needles." Spirally formed "needles" could also be produced using the apparatus and techniques disclosed and claimed in Karkoska U.S. Patent 3,071,175. The product of the shredding process is a strip having a continuous marginal band to which the shredded "needles" are attached.

In accordance with this invention, it has been found that the aforementioned shredded foil can be manipulated into an ornamental array of "needles" simulating a ball-like configuration.

In the drawings,

FIGURE 1 is a diagrammatic plan view of an apparatus which is employed in one of the initial steps in the manufacture of the ornament of this invention.

FIGURE 2 is a view representing the shredded sheet material which is employed in the manufacture of the decorative ornament.

FIGURE 3 is a diagrammatic representation of the form that the shredded foil takes after it has been initially wound on the apparatus shown in FIGURE 1.

FIGURES 4 and 5 are enlarged fragmentary views illustrating the sequential deformation of the shredded needles during the preferred upsetting operation to form the spherical configuration.

FIGURE 6 illustrates the spherical configuration assumed by the shredded foil after the upsetting operations of either the preferred or the alternative methods have been completed.

FIGURE 7 illustrates diagrammatically the sequence of alternative upsetting operations employed in the formation of the spherical configuration.

FIGURES 8–10 and 13 are enlarged fragmentary views illustrating the sequential deformation of the shredded needles during an alternative forming operation to form the spherical configuration.

FIGURE 11 is an illustration of the form that the configuration shown in FIGURE 3 assumes as the initial alternative upsetting operation of FIGURES 8–10 is carried out.

FIGURE 12 illustrates the configuration which the helically wound shredded foil assumes before the second upsetting operation of FIGURE 13.

FIGURE 14 illustrates schematically the double-fringed foil which is utilized in another alternative method of forming the decorative ornament of this invention.

FIGURE 15 illustrates diagrammatically the sequence of alternative upsetting operations utilized in the fabrication of the double-fringed alternative embodiment.

FIGURES 16–19 are enlarged fragmentary views illustrating the alternative sequential steps of FIGURE 15 utilized in deforming the shredded needles of the roll of fringe to form the finished alternative decorative ornament.

Figure 10:
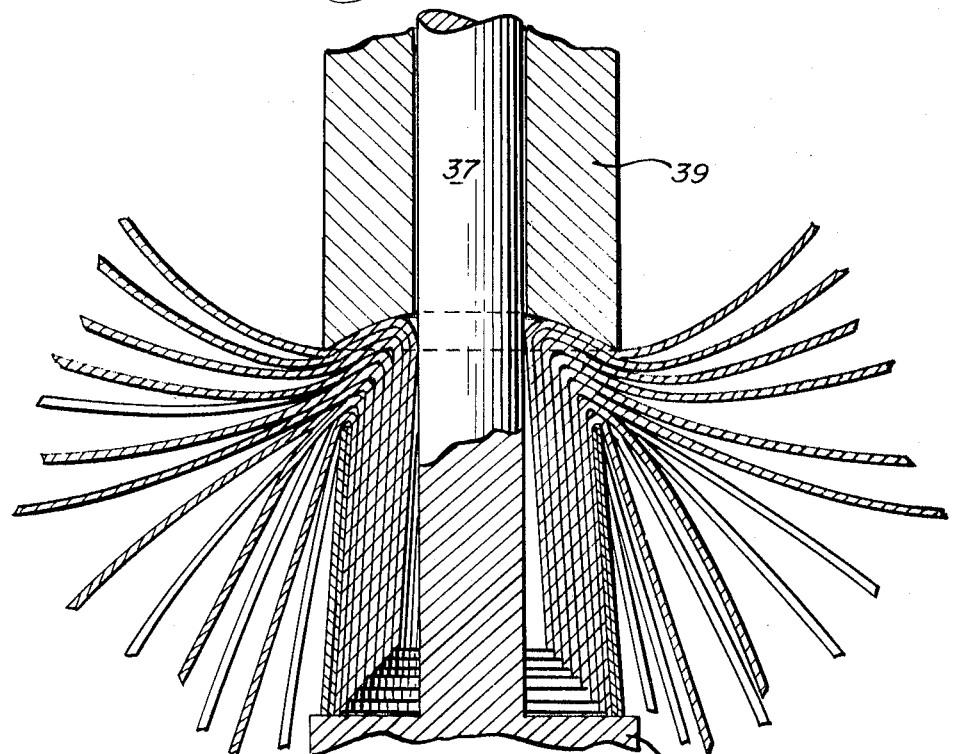

The spherical ornament of this invention is preferably effected by utilizing a thin ductile sheet material such as aluminum foil in the forming operation. Although various thicknesses can be employed, it has been determined that excellent results can be obtained by utilizing a 5000 series aluminum alloy foil of the type that has found extensive application in the manufacture of artificial Christmas trees. This foil generally has a thickness of .0015 to .002 inch. The initial step which is performed in the manufacture of the decorative ornament of this invention involves a so-called shredding operation in which the aluminum strip is fed through a shear which cuts transversely across substantially the entire width of the aluminum strip to form narrow strips which are held together in a continuous contiguous relationship by a continuous narrow marginal band. It has been found that shredded foil prepared from aluminum strip 0.0018 inch thick and three inches wide which has been shredded to provide narrow strips of about $3/16$ inch wide attached to a narrow band about $1/4$ inch wide can be effectively formed into the decorative ornament of this invention.

The shredded foil is formed into a helical coil by a suitable winder apparatus which will roll the shredded foil into a tightly wound helix. It will be noted that the continuous marginal band does not overlay itself in a marginal alignment but is pitched to form a core which is substantially longer than the width of the continuous band. Thus, the interior of the core assumes a conical configuration. The amount of the pitch can be determined experimentally with smaller pitches providing fuller clusters. In using shredded foil produced using the aforementioned Karkoska apparatus, the pitch is automatically produced by virtue of the automatic tracking effected by the deformations at the juncture where the narrow strips are attached to the continuous band. In forming the initial cluster, such as shown in FIGURE 3 by means of the apparatus shown in FIGURE 1, a simple winder apparatus consisting of a rotating shaft 10 mounted in bearings 11 and 12 is used. The bearings are attached to a base 13 upon which is also mounted a drive means such as electrical motor 14. The motor is coupled to drive shaft 10 by means of a gear train consisting of driver gear 15 and driven gear 16.

The end of shaft 10 opposite the means for attaching the driven gear member 16 thereto is a necked down portion 17 upon which the shredded foil 18 is wound. FIGURE 2 illustrates the shredded foil 18 held together by the continuous band 19. The distal end of the necked portion 17 is provided with a transverse slot, not shown, in which the continuous band 19 of the shredded foil is fixed in order to initiate the winding operation and prevent the foil from sliding on the shaft.

A sleeve member 21 is slidably mounted on the proximal end of the necked portion of the shaft. A reciprocating action is imparted to the sleeve member 21 by means of pivotal lever 22 which is linked to sleeve 21 by coupling means 23. A spring 24 is used to maintain the sleeve member in a position normally in abutment against the shoulder portion of the shaft 10 where the necked down portion 17 is joined to the remainder of shaft 10. Sleeve 21 is used in the illustrative embodiment to force the helically wound cluster away from the necked down portion 17 of shaft 10. It has been found that, under normal winding conditions, the fringed foil cluster will be frictionally held upon the shaft such that mechanical assistance is required in forcing the wound core from the shaft 10.

After the cluster shown in FIGURE 3 has been initially formed, the wound helical core 25 is placed upon an anvil 26, such as shown in FIGURE 4, with the base of the helical core resting on the dish shaped base 27 of the anvil. In order to insure the positive positioning of the helical core on the anvil, a pin guide 28 is used. The pin guide 28 is axially aligned with the axis of the anvil 26. The initial mounting of the cluster on the anvil is shown in FIGURE 4.

The second step consists of employing a driver or die member 29 as shown in FIGURE 5. The driver 29 has a dish shaped face 30 and is provided with an axial bore 31 which engages pin guide 28. In the second step, an impact force is applied to the driver end (not shown) of driver 29, and the driven end causes the plies of the elongated helical core 25 to be driven into a more compact helical core 32 such as shown in FIGURE 5 where the driver 29 is in an intermediate position on the pin guide 28. The impact not only drives the plies of the core into a more dense arrangement but also causes the shredded needles to be replicately bent over the dense core, with some of the needle being bent downwardly as illustrated by reference numeral 33, some of the needles bent in a generally outwardly direction as illustrated at reference numeral 34, and some of the upper needles bent in an upward direction as illustrated by reference numeral 35. The force is applied such that at the end of the stroke of driver 90, the needles are deformed into a complete spherical configuration to form an ornamental ball as illustrated in FIGURE 6.

It has been determined that a shredded strip of at least seven feet, which has been wound as in FIGURE 1 to form the helical cluster shown in FIGURE 3, and subsequently subjected to the forming operations of FIGURES 4 and 5, is an optimum length so that the formed spherical ball will be complete and not present a sparse appearance. It is understood, of course, that lengths of shredded strips less than seven feet can also be utilized, however, the resulting formed spherical ball will not provide a "full" appearance. Further, in utilizing the upsetting operations of FIGURES 4 and 5, a seven foot strip length enables the core to be formed in a suitable manner such that a complete spherical cluster as in FIGURE 6 will occur. Personal preferences and economic reasons will of course dictate and determine the preferred length of shredded foil to be utilized. It has also been determined that in employing the preferred forming operations of FIGURES 4 and 5, the dish shaped face 30 of driver 29 should have a slightly larger curvature than the dish shaped face 27 of the anvil 26. In practicing the invention it has been determined that an anvil 26 in which the dish shaped face 27 has been machined on a lathe with the lathe cutting tool being moved out from the inner to the outer portion of anvil 26 at a constant lathe cutting tool angle setting of ten degrees, and similar machining of the driver 29 with the dish shaped face 30 machined at between 20–40 degree cutting tool angle, preferably 40 degrees, has been found to provide an extremely efficient upsetting operation (as illustrated in FIGURES 4 and 5) to form the complete ornamental ball of this invention.

An alternative upsetting operation is illustrated diagrammatically in FIGURE 7 and in the enlarged fragmentary views of FIGURES 8–10 and 13. FIGURES 11 and 12 also illustrate the form assumed by the cluster during the alternative upsetting operation.

In this alternative upsetting operation, after the cluster shown in FIGURE 3 has been initially formed, the core is placed upon an anvil 36, such as shown in FIGURE 8 with the base of the helical core resting on the face of the anvil. A pin guide 37 which is axially aligned with the axis of the anvil 36 is utilized to assure the proper positioning of the helical core on the anvil as previously described. It may be particularly noted that the anvil 36 utilized in this alternative upsetting operation has a simple flat face 38. The initial mounting of the cluster on the anvil is shown at FIGURE 7(b) corresponding to FIGURE 8.

Figure 13:
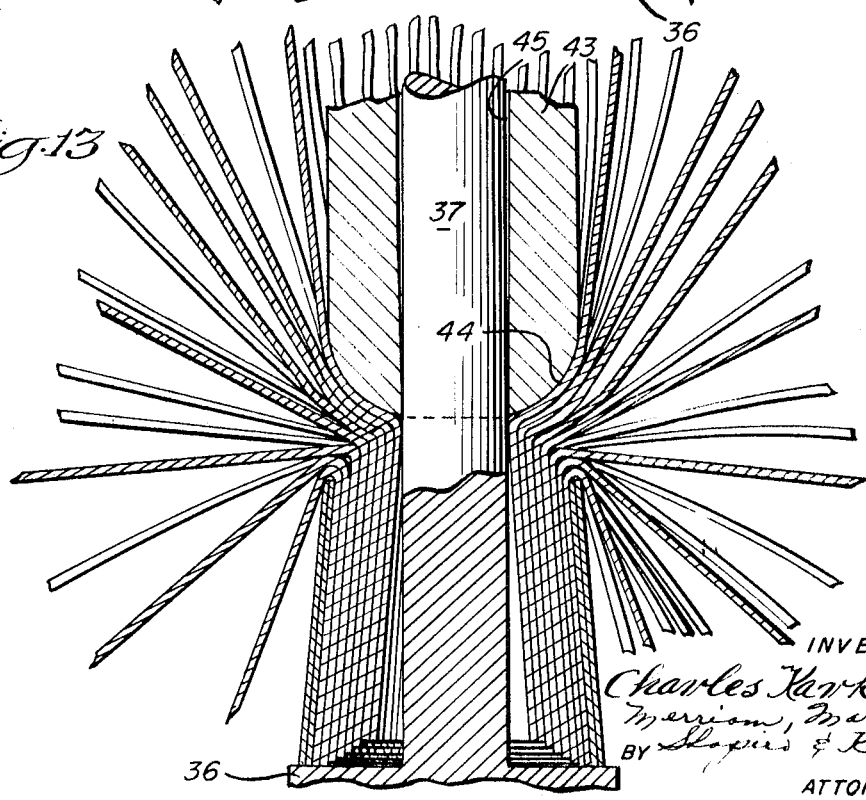

A second step consists of employing a driver 39 shown in FIGURE 9. The driver 39 has a dish shaped face 40 similar in dimensions to the dish shaped face 30 of driver 39. An axial bore 41 is provided in the driver 39 to engage the pin guide 37. In the second step, an impact force is applied to the driver end (not shown) of driver 39 and the driven end causes the plies of the elongated helical core to be driven into a more compact helical core 42 such as shown in FIGURE 9 where the driver 39 is in an intermediate position on the pin guide 37. The impact not only drives the plies of the core into a more dense arrangement but also causes the shredded needles to be replicately bent over the dense core. The shredded foil assumes the configurations illustrated in FIGURES 11 and 12 corresponding respectively to the operations performed in accordance with FIGURES 9 and 10. The force is applied such that at the end of the stroke of driver 27, as shown in FIGURES 10 and 7(c), the core and needles are deformed into a hemispherical configuration downward and outwardly over the anvil 36. Thereafter, a second driver 43, shown in FIGURE 13, is employed to complete the formation of the spherical ornament.

It will be noted that the driver 43 has a rounded tip 44 and has a smaller outer diameter than the initial driver 39 which was used in the second forming step. Driver 43 is provided with an internal bore 45 which also is used to engage guide pin 37. A sufficient force is applied to the driver end (not shown) of driver 43 to deform a portion of the shredded needles at the upper end of the dense core into an upward direction to complete the formation of the spherical ornament. The final forming step which is illustrated in FIGURE 7(d) produces the final shape of the ornament which is illustrated in FIGURE 6.

A further alternative technique which also involves the formation of a helically formed cluster of shredded aluminum foil is illustrated in FIGURES 14–19. In this embodiment, the cluster is formed by employing a shredded blank of aluminum foil 50 which is shredded along opposed marginal edges to form two separate continuous marginal bands of fringe 51 and 52 joined by means of the continuous strip 53. Various techniques can be utilized to form such a band. The shredded fringe can be fabricated by fastening together, such as by sewing, suitable adhesives or the like, two bands of fringe such as are shown in FIGURE 2. The fringed ribbon can also be formed by a suitably designed cutting knife such as is used in the aforementioned Karkoska application, United States Patent No. 3,071,175, which will produce the double-fringed marginal bands attached to a common strip from a single strip of metal foil.

In utilizing the double-fringed band, a suitable spinning apparatus is employed such that the continuous strip 50 is helically wound upon itself with the edges of strip 50 maintained in marginal alignment as opposed to the displaced alignment employed in the heretofore discussed technique. A cluster 55 of the double-fringed ribbon is shown in FIGURE 14(a). Referring to FIGURES 16 and 17, in the forming operation employed in preparing this alternative embodiment, a guide rod 60 is inserted through the hollow opening left in the core 54. A pair of similar drivers 61 and 62 provided with concave driven faces 63 and 64 similar to the dish shaped face 30 of driver 29, are slid over guide rod 60 through internal axial bores 65 and 66 provided, respectively, in drivers 61 and 62. The diameter of the driven face of drivers 61 and 62 are slightly larger than the outer diameter of the core 54 of cluster 55. The drivers are driven together in a relative motion such that the shredded needles are deformed and spread outwardly in the manner shown in FIGURE 18. Sufficient impact is applied to the driven end (not shown) of drivers 61 and 62 to spread the needles outwardly and form a flattened cluster such as is shown schematically in FIGURE 15(b).

Thereafter, drivers 61 and 62 are replaced by drivers 70 and 71 which are similar in dimensions to driver 43 which has been described above. Drivers 70 and 71 have rounded tips 72 and 73 and internal bores 74 and 75, which bores slide upon guide rod 60. Sufficient impact is provided to deform the needles attached to the innermost plies of the upset core into opposed directions. Whereupon the application of an impact force of a sufficient amount is used to produce the spherical ornament shown schematically in FIGURE 15(c). In all three of the upsetting techniques illustrated, it must be realized that the wound core has an important role in maintaining its form so that the needles will be properly bent over, out and up in relation thereto.

It is evident that variations and modifications of the forming technique can be employed without departing from the spirit of this invention. Various types of drivers and driving faces suitable to effect the sequential deformation of the shredded needles in the forming techniques illustrated by the illustrative embodiments can be employed.

The amount of shredded foil which is used will, of course, depend upon the desired size of the finished ornament as well as the thickness and ductility of the fringed material which is utilized to form the decorative ornament of this invention.

In view of the hereinbefore described forming operations, it is evident that the material which is used must be sufficiently ductile such that it can be deformed without rupturing the needles from the continuous strip to which they are attached. Although aluminum foil having a thickness of 1.5 and 2.0 mils has been found to be satisfactory, it is evident that other materials, either alone or in combination with still other materials, can be employed to provide a stock material having the necessary ductility to permit permanent upsetting and deformation of the material without rupturing and subsequent separation of the needles from the strip.

Various decorative effects can be obtained by coating the opposed sides of the stock sheeting with different colors or, in the case of aluminum foil, leaving one of the sides uncoated. In the instance where a double band of marginal fringe is employed to form the decorative ornament and the shredded ribbon is formed by attaching together two single strips, a plurality of color effects can be obtained by the use of different colors on the faces of the several bands which are used. Aside from the materials of construction which are utilized in the formation of the shredded ribbon, conventional materials of construction can be employed in the tools used in the deforming steps.

In the illustrative embodiments a strip of 0.0018 mil aluminum metal foil three inches wide was used. The material was shredded in an apparatus described in the aforementioned Karkoska United States Patent No. 3,071,175 to provide shredded needles $\frac{1}{16}$ inch wide attached to a continuous band $\frac{3}{16}$ inch wide. Seven feet of the material was helically wound with the marginal edges displaced to form a cluster such as shown in FIGURE 3. The helical core formed by the continuous strip was about 1½ inches long. This cluster was then upset utilizing an anvil having a guide pin $\frac{3}{16}$ inch in diameter with a face having an outer diameter of ½ inch. The driver used in the initial upsetting step had an outer diameter of $\frac{13}{32}$ inch and was provided with an axial bore of sufficient diameter to permit it to snugly ride upon the guide pin of the anvil.

The driver 43 illustrated in FIGURE 13 consisted of a steel shaft having an outer diameter of $\frac{3}{8}$ inch with a rounded tip. The axial bore in this driver was sufficient to permit it to ride snugly on the pin guide.

The tools utilized in the manipulative technique employed to form the alternative embodiment illustrated in FIGURES 14–19 utilized a guide rod having a diameter of $\frac{3}{16}$ inch. Substantially identical drivers having outside diameters of approximately $\frac{5}{8}$ inch and with corresponding concave faces were used in the initial upsetting operation. The concave faces were formed in a similar manner as described for the previous embodiments. The driver used in the second upsetting operation had an outer diameter of $\frac{3}{8}$ inch with a rounded tip. It is possible that this technique employing two moving drivers could be reduced to a single step upsetting operation by utilizing a pair of concave drivers with outer diameters slightly less than the core diameter of the wound cluster.

In applying the necessary impact, blows with a conventional carpenter's hammer can be used to effect the upsetting. In such a manual operation, it is preferred that either the driver or one of the pair of drivers be suitably mounted in a suitable holder. However, the relative movement of the anvil and driver, or the pair of drivers as the case may be, can be automated by suitable machine design, such as kick press or punch press operations.

Although this invention has been hereinbefore described with the reference to illustrative embodiments as well as generalized descriptions, it is apparent that variations and modifications can be made either in the forming steps or in the tools used therein to effectuate the objective of this invention. Accordingly, it is requested that this invention be limited only in the manner set forth in the appended claims.

What is claimed is:

1. The method of manufacturing a ball-like ornamental device including the steps of:
   providing a shredded needle metal foil;
   winding said shredded foil to form a wound cluster with the needles extending from a core; and
   upsetting said needles by applying an impact force at said core inside said cluster to direct the needles radially, omnidirectionally from the core to form a spherically shaped ornamental cluster.

2. The method of manufacturing a ball-like ornamental device including the steps of:
   providing a shredded needle metal foil;
   winding said shredded foil to form an overlapping helical core cluster configuration with the needles extending from said core; and
   applying an impact force to one end of said helical core inside said cluster while maintaining the other end fixed in position to provide a more compact helical core configuration spreading said needles radially outwardly, omnidirectionally from the core, forming a spherically shaped ornamental cluster.

3. The method of manufacturing a ball-like ornamental device including the steps of:
   providing a shredded needle metal foil;
   winding said shredded foil to form a wound cluster with the needles extending from a core;
   bending said needles by applying an impact force at said core inside said cluster to spread said needles outwardly; and
   deforming a portion of the bent needles by applying an impact force inside said cluster to direct the needles radially, omnidirectionally from the core to form a spherically shaped ornamental cluster.

4. The method of manufacturing a ball-like ornamental device including the steps of:
   providing a shredded needle metal foil;
   winding said shredded foil to form a wound cluster with the needles extending from a core;

bending said needles into a hemispherical shape by applying an impact force at said core; and deforming a portion of the needles by applying an impact force inside said cluster to direct the needles radially, omnidirectionally from the core to form a spherically shaped ornamental cluster.

5. The method of manufacturing a ball-like ornamental device including the steps of:

providing a shredded needle metal foil;

winding said shredded foil to form an overlapping helical core cluster configuration;

applying an impact force to one end of said helical core configuration inside said cluster while maintaining the other end fixed in position to provide a more compact helical configuration spreading said needles outwardly; and deforming a portion of the bent needles to separate said portion of needles by applying an impact force inside said cluster to direct the needles radially, omnidirectionally from the core forming a spherically shaped ornamental cluster.

6. The method of manufacturing a ball-like ornamental device including the steps of:

shredding a metal foil to form a plurality of contiguous needles connected by a marginal band;

winding said shredded needle foil into a helical coil cluster so that the marginal band assumes an overlapping helical configuration with the needles extending from a core within said configuration;

placing said helical coil on an anvil having a pin guide such that the axis of the helical coil coincides with the pin guide and one end of the coil rests on the anvil;

applying a guided impact force inside said cluster to the core at the free end of the helical coil and along said pin guide to drive the helical coil into a more compact configuration and cause the shredded needles to be replicately bent in a downward and outwardly manner over the anvil; and applying a subsequent guided impact force inside the cluster along said pin guide towards the core to deform a portion of the bent needles into an upward direction away from the anvil forming a spherically shaped ornamental cluster with the needles directed radially, omnidirectionally from the core.

7. The method of manufacturing a ball-like ornamental device including the steps of:

providing a shredded needle metal foil which is shredded along opposed marginal edges;

winding said shredded foil to form a double-fringed wound cluster on opposite sides of an intermediate marginal edge with the needles extending from a core within said cluster;

applying a guided impact force within each end of the wound cluster towards the intermediate marginal edge to spread the needle cluster outwardly; and applying a second guided impact force within each end of the wound cluster to deform a portion of the needles, forming a spherically shaped ornamental cluster with the needles directed radially, omnidirectionally from the core.

8. The method of manufacturing an ornamental device including the steps of:

providing a shredded needle metal foil which is shredded along opposed marginal edges;

winding said shredded foil to form a hollow double fringed wound cluster on opposite sides of an intermediate marginal edge;

placing a guide rod through and coextensive with the hollow wound cluster;

applying a guided impact force along said guide rod and within each end of said cluster towards the intermediate edge to spread said needles outwardly; and applying a second guided impact force along said guide rod and within each end of said spread apart cluster to deform a portion of said needles and form a spherical ornamental cluster.

9. A spherical ornamental cluster comprising a plurality of needles emanating from a core, said cluster being formed by winding a shredded needle metal foil to form a wound cluster with a helical core configuration, and impacting said core into a more compact configuration to spread said needles outwardly in all directions from said core.

10. An ornamental ball-like device comprising:

a central core including a resilient metal strip forming a plurality of overlapping layers; and having a plurality of fingers formed in said metal strip, said fingers extending radially, omnidirectionally in all directions from said central core to form a spherical ball-like configuration.

11. An ornamental device as claimed in claim 10, wherein said resilient metal strip is aluminum.

12. An ornamental device as claimed in claim 11, wherein said fingers have a spiral configuration.

References Cited

UNITED STATES PATENTS

| | | | |
|---|---|---|---|
| 3,041,767 | 7/1962 | Ranoha et al. | 161—22 |
| 3,176,361 | 4/1965 | Jensen | 24—90 |
| 360,000 | 3/1887 | Darnall. | |

JACOB H. STEINBERG, Primary Examiner

U.S. Cl. X.R.

29—148.4; 161—12, 16, 27